United States Patent [19]
Barnes

[11] 4,312,175
[45] Jan. 26, 1982

[54] AGRICULTURAL ROTARY MOWERS
[76] Inventor: Stephen J. Barnes, 51 Roy St., Palmerston North, New Zealand
[21] Appl. No.: 9,945
[22] Filed: Feb. 6, 1979
[30] Foreign Application Priority Data
Feb. 10, 1978 [NZ] New Zealand .......................... 186438
[51] Int. Cl.³ ............................................ A01D 35/26
[52] U.S. Cl. ......................................... 56/16.2; 56/17.3
[58] Field of Search .................. 56/17.3, 16.2, 121.41, 56/503, 14.5, 60, 6

[56] References Cited

U.S. PATENT DOCUMENTS

| | | | |
|---|---|---|---|
| 1,903,335 | 4/1933 | Falkiner | 56/60 |
| 2,510,242 | 6/1950 | Minns et al. | 56/121.44 |
| 3,513,647 | 5/1970 | Johnston et al. | 56/14.5 |
| 3,548,572 | 12/1970 | Ferber | 56/192 |
| 3,673,779 | 7/1972 | Scarnato et al. | 56/503 |
| 3,735,572 | 5/1973 | Kasberger | 56/16.2 |
| 3,901,004 | 8/1975 | Barnes | 56/17.3 |
| 4,094,132 | 6/1978 | Decoene et al. | 56/14.4 |

Primary Examiner—Robert A. Hafer
Attorney, Agent, or Firm—Holman & Stern

[57] ABSTRACT

An agricultural rotary mower has a frame mountable upon three point linkage of a tractor. A rotor supporting beam extends in its operating position to one side of the tractor. Extended from the beam are two spindles with ground engaging skids at the lower end. Frustro conical rotors are mounted on the spindles and in use a single cutting swathe is formed with the rotors driven by independant drives to rotate in opposite directions towards one another. A crop compressing head is located in advance of the rotors and this together with a slight inclination of the shafts towards one another ensures an even cut of crop and a wide relatively undisturbed windrow of cut crop.

5 Claims, 5 Drawing Figures

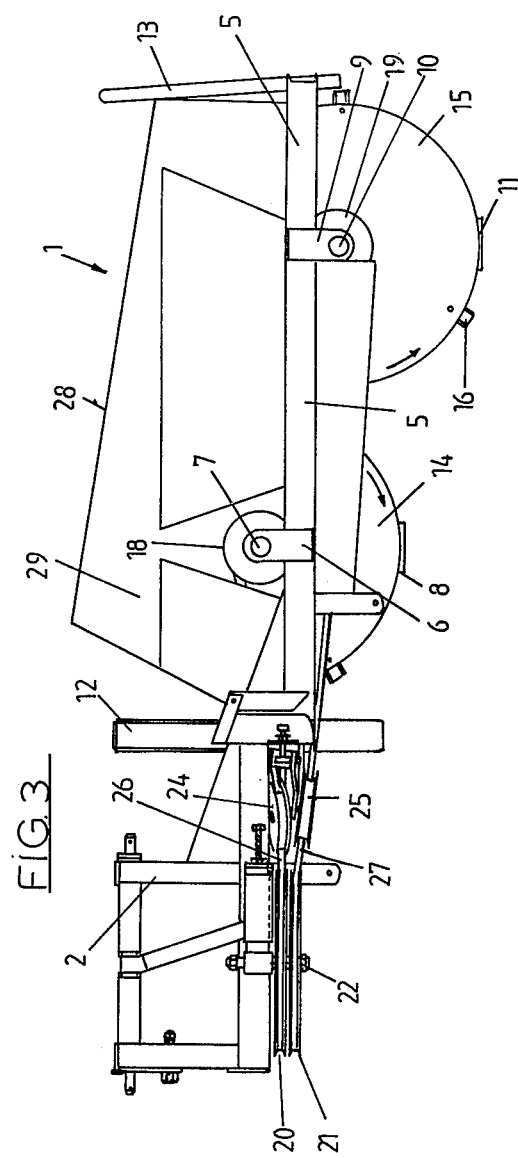

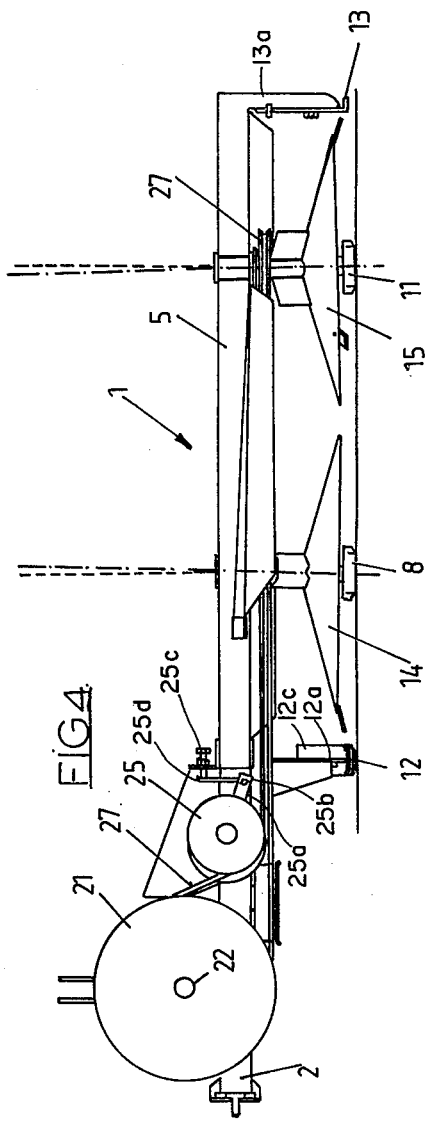

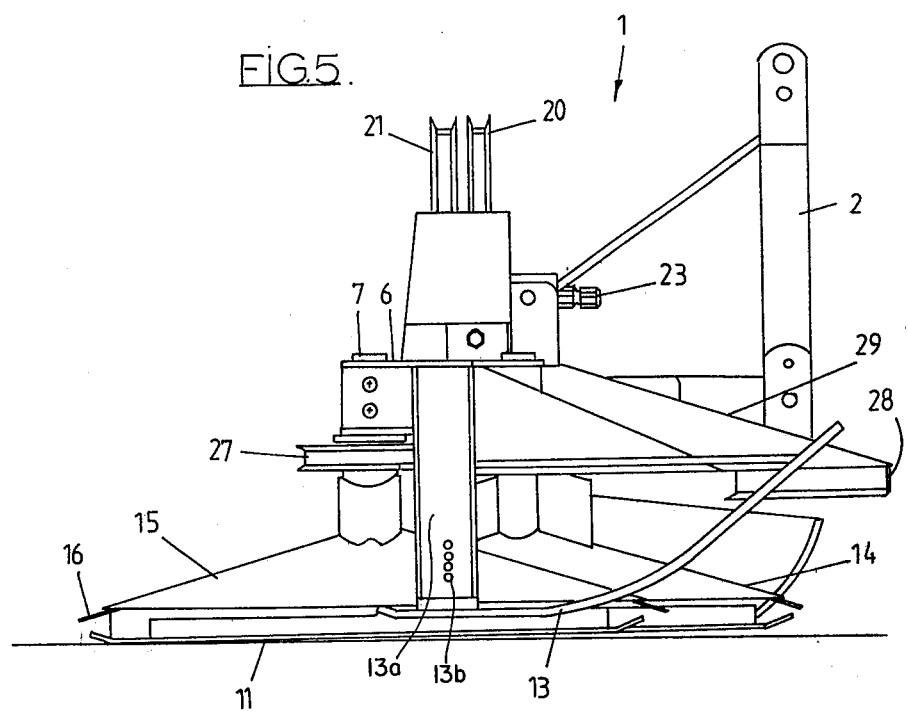

AGRICULTURAL ROTARY MOWERS

BRIEF SUMMARY OF THE INVENTION

I have developed a single rotor agricultural mower described and claimed in my U.S. Pat. No. 3,901,004. This mower presented a significant departure from conventional drum type design and has proved a considerable commercial success.

I have now developed a twin rotor agricultural mower. With the multiple rotor mower I have encountered a number of problems. It was desirable to provide a wide windrow with the crop lying in the direction of travel best for fine cut forager. The cutting action and movement of the cut crop to the window should be smooth and with the minimum of movement of the crop. This is particularly significant for seed crops as undue movement will result in significant seed loss. Also if the crop can be presented in a substantially undisturbed position it facilitates drying. Further the cut stubble should be smooth with no scolloping or uncut strip.

Accordingly, in one aspect the invention may broadly be said to consist in an agricultural rotary mower comprising a primary frame mounting means in said primary frame to engage the three point linkage assembly of a tractor, a rotor supporting beam supported from and extending to one side of said primary frame, at least two spindles dependant from said rotor supporting beam, a ground engaging means at the end of each said spindle, a single blade transporting rotor mounted upon each spindle, a plurality of cutting blades attached to said rotor to project beyond the periphery thereof with the rotors in use forming a single cutting path, the spindles being inclined towards one another so that the cutting height of the rotors adjacent one another is less than the cutting height at the outer sides of the rotors and drive means to drivably connect the rotors to the power take off of the tractor so that in use relative to the line of cut the rotors will rotate in opposite directions towards one another.

In a further aspect the invention may broadly be said to consist in an agricultural rotary mower comprising a primary frame mounting means in said primary frame to engage the three point linkage assembly of a tractor, a rotor supporting beam supported and extending to one side of said primary frame two spindles dependant from said rotor supporting means, a ground engaging means at the end of each said spindle, a single frustro conical blade transporting rotor mounted upon each said spindle, a plurality of cutting blades attached to said rotor to project beyond the periphery thereof with the rotors in use forming a single cutting path, crop compression means in advance of the rotors to hold the crop in compression prior to cutting so that in use a wide and relatively undisturbed swathe of crop is moved over the inclined surfaces of the frustro conical rotors and drive means to driveably connect the rotors to the power take-off of a tractor so that in use relative to the line of cut the rotors will rotate at opposite directions towards one another.

BRIEF DESCRIPTION OF SEVERAL VIEWS OF THE DRAWINGS

FIG. 3 is a plan view of the mower according to the present invention, FIG. 4 is an elevation of the mower shown in FIG. 3, and FIG. 5 is an end view of the mower as shown in FIG. 3.

DETAILED DESCRIPTION OF THE PREFERRED EMBODIMENT

Figure 1:
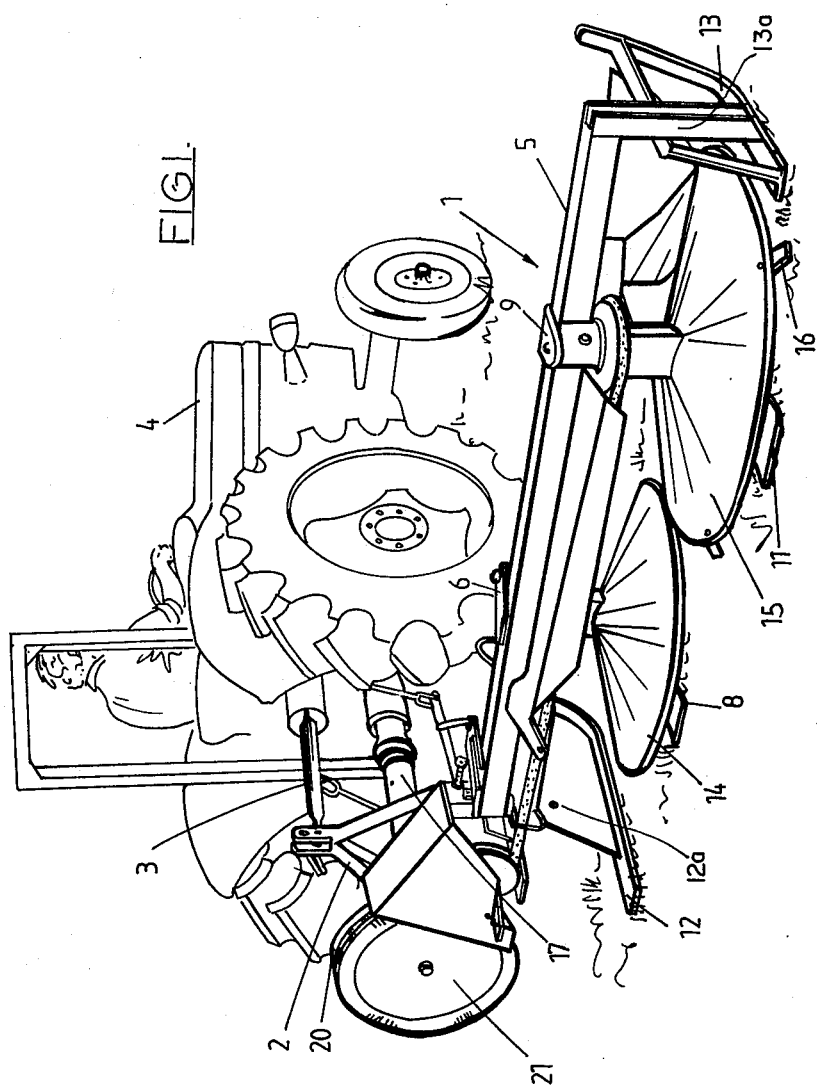
FIG. 1 is a pictorial view of an agricultural rotary mower according to the present invention attached to a tractor in use.

In the preferred form of the invention an agricultural rotary mower 1 has a primary frame 2 arranged in use to be connected to the three point linkage assembly 3 of a tractor 4.

A rotor supporting beam 5 extends from the primary frame so that in the operating position it projects out to one side of the tractor substantially normally to the direction of movement of the tractor. The beam is connected to the primary frame so that it may be pivotted rearwardly to a transport position close to the rear of the tractor. A shear pin is also incorporated to allow the arm to move to a break back position in the event of an obstacle being struck by the mower in use.

Two spindles are supported from the rotor supporting beam 5. The spindles are preferably fixed spindles although rotating spindles could be used. An inner spindle support arm 6 projects forwardly of the beam and supports a fixed spindle 7 which has at its lower end a ground engaging skid 8.

A second spindle support arm 9 projects rearwardly from the arm 5 and supports a fixed spindle 10 which inturn terminates in a ground engaging skid 11. In the case of rotating spindles a disc type skid means are provided with suitable bearing connection between the spindle and the disc member.

An inner ground engaging skid 12 includes a vertical mounting plate 12a which is adjustably supported from a mounting arm 12b on the primary frame by an adjustably bolt connection 12c. Similarly, an outer skid and crop guiding arm 13 adjustably bolted to and supported from the end 13a of the arm 5 by bolt type connections 13b making this skid also adjustable in height. The forward end of the skid 13 is inclined upwardly and may be directed inwardly slightly and acts as a crop divider. The height of the skid 13 may be adjusted so that is does not engage the ground in use. In such a mode the mower is supported by the skid 12 and the skids 8 and 11 at the base of the rotor spindles. This is an advantage because with some crops engagement by the outer skid can compress a strip of uncut crop and lead to an uneven finished cut once the compressed strip of crop recovers after cutting. All skids are inclined forwardly on a slight angle relative to the horizontal.

The arrangement of the skids allows the mower to be supported on the inner skid 12 and the skids 8 and 11 at the base of the spindles. In this mode, as was explained above the outer skid merely operates as a crop divider. However the height of the outer skid may be adjusted so that the mower is supported on the inner skid and the outer skid or on all four skids. Where the mower is to be used for topping the support will be solely on the inner and outer skids with the height appropriately adjusted. This flexibility of support to allow for various modes of operation is not present in any other mower of which I am aware.

Identical rotors 14 and 15 are mounted on the fixed spindles 7 and 10. Each rotor comprises a frustro conical shell with an inner strengthing disc towards the base thereof. A vertical central spindle receiving tube extending between the top of the shell and the disc and bearing journals are fitted in said tube. A plurality of cutting blades and preferably three cutting blades 16 are attached to each rotor with reinforced plates located at the point of attachment. For further details of the construction of the rotor reference may be made to U.S. Pat. No. 3,901,004.

The spacing of the spindles 7 and 10 and the size of the rotors 14 and 15 are such that in use a single cutting swathe is formed with no uncut strip of crop located between the two rotors. The cutting swathe in the preferred model is 2.07 meters (6'9").

Drive means are provided to drivably connect the rotors 14 and 15 to the power take-off 17 of the tractor 4. The drive means are arranged so that relative to the line of cut the rotors will rotate in opposite directions towards one another in accordance with the arrows as shown in FIG. 3.

I have found that there are considerably advantages in using a belt drive with a separate belt drive for each rotor. To this end a pulley 18 is connected to the top of the rotor 14 and a pulley 19 is connected to the top of the rotor 15. Pulleys 20 and 21 are drivably connected to a shaft 22 suitably mounted in bearings in the primary frame 2 and arranged with the forward end 23 connectable in use to the power take-off 17 of the tractor. Idler pulleys 24 and 25 are rotatably mounted on bracket 25a which in turn is supported on stub axle 25b located on the primary frame. An adjustment bolt 25c engages an arm 25d of the bracket 25a to move the bracket about the pivot 25b to allow for belt tensioning. A belt 26 extends from the pulley 20 about the idler pulley 24 and pulley 18 to drive the rotor 14 and a similar belt 27 passes about pulley 21, the idler 25 and the pulley 29 to drive the rotor 15. With such a construction there is a single belt drive for each rotor.

With existing drum mowers there is a tendency to produce a scolloped appearance in the stubble left once a crop has been cut. This is particularly evident with drier hard grasses. I believe this is caused by the cut crop from the outer portion of the swath flattening the crop in the centre area before it is cut so that although the blades are at constant height above the ground the stalks towards the outer portion of the swath are substantially vertical while the stalks between the pair of rotors and centrally of the swath are leaning or bent over and once the stubble of these stalks stand up in a vertical position you are left with the uneven scolloped effect which is undesirable. In order to overcome this difficulty I have inclined the shafts 7 and 10 towards one another at a slight angle. Thus the adjacent edge portions of the spaced rotors edges in use are closer to the ground than the outside or diametrically opposite edge portions of the rotors. I believe a considerable range of inclinations would work for example $\frac{1}{4}°$ to 5° although the preferred range would be between $\frac{1}{2}°$ and 2°. This inclination will need to be related to the diameter of the rotor but with rotors of just over a meter in diameter the cutting height in the centre where the rotors meet should be 8 to 20 mm and preferably 10 to 12 mm less than on the cut sides of the rotors. The inclination is not great so that no compensatory measures are necessary with the belt drive as described above.

Coupled with the problem of the even stubble height is the need to produce even comparitively wide windrows of cut crop and in some applications it is highly desirable to ensure that there is the minimum movement of the crop from cutting to placement in the windrow. The minimum movement and smooth cutting is desirable for seed crops and also the crop should be left with the seed heads exposed for further quick drying.

Figure 2:
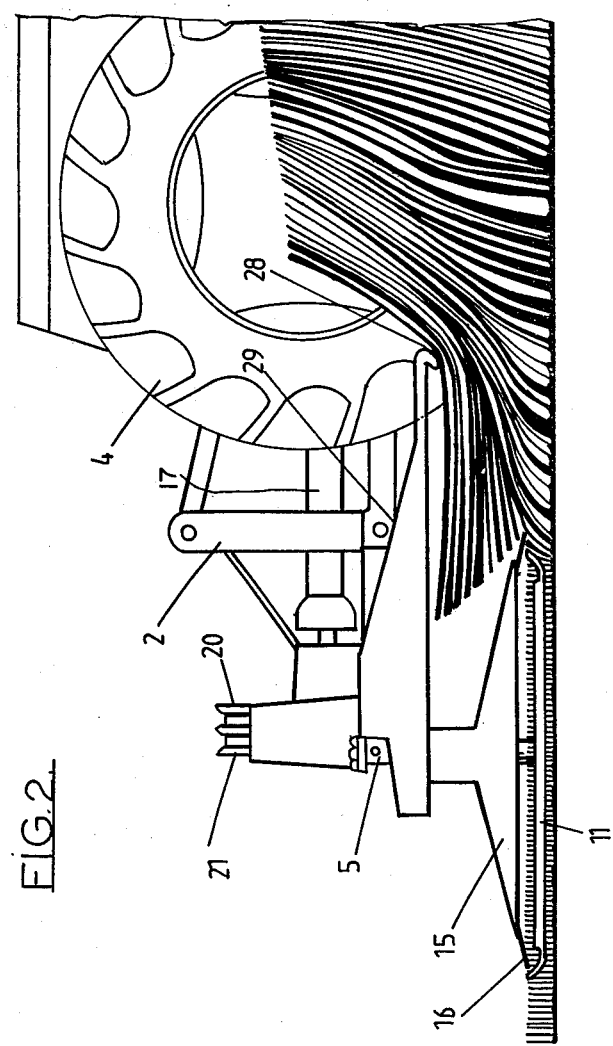
FIG. 2 is a diagrammatical end view showing the operation of the crop compression means.

I have achieved this by providing a crop compressor 28 diagrammatically illustrated in FIG. 2 and included in the leading edge of the cowling 29 supported from the rotor support beam 5. The cowling is inclined downwardly from the beam 5 so that the height above the ground is approximately 250 mm (10"). The distance from the leading edge of the cowling to the forward cutting edge of the rotor is also approximately 250 mm. The crop compressor 28 is conveniently incorporated in the front edge of the cowling cover 29 but it would operate equally effectively if it was provided as a separate member or if it was in the form of a roller rather than a fixed member.

The provision of the compressor 28 has a number of important consequences. It will be seen that the crop is pushed forward and pressed down by the compressor 28 prior to being cut by the rotor 2 (see FIG. 2). One unexpected result of this is a considerable reduction in the power necessary to operate the mower. I believe this reduced input power has been achieved by tensioning the crop stalk before it is cut. In practice I have found that the mower operates much more effectively and efficiently where the compression member is in use and tensions the stalk away from the blade. As will be seen from the diagram in FIG. 2 the location of the head more closely adjacent to the leading edge of the cutter blade would not operate in the same way. This is an important distinction between my invention and other mowers which might have incorporated a guarding cowling purely for the operation of guarding the mower blades.

With the crop being pressed down and thus held in compression there is less movement of the crop when it is cut causing the crop to bunch together and have the stalks turned relative to the tops. The movement of the cut crop with my mower is smooth as it passes about the rotors resting on the inclined surfaces to be discharged as a wide even windrow filling the aperture between the rotors 14 and 15. The stalks in the cut crop remain towards the ground and the top of the crop is still exposed to the sun. This placement of the windrow has considerable advantage for crops such as seed crops which are to be cut and allowed to dry prior to final harvesting.

The rotors 14 and 15 in the frustro conical form have a relatively large diameter to their height. The height is about one quarter the diameter where as with normal drum type mowers the drum height is about two thirds the diameter. My construction makes it easier to balance the rotors and normally static balancing is sufficient thus avoiding the need for expensive dynamic balancing.

What is claimed is:

1. An agricultural rotary mower comprising a primary frame, mounting means in said primary frame to engage the three point linkage assembly of a tractor, a rotor supporting beam supported from and extending to one side of said primary frame, two spindles dependant from said rotor supporting beam in substantially horizontal spaced relationship, a ground engaging skid at the lower end of each said spindle, a frusto-conical blade transporting rotor rotatably mounted upon each spindle, a plurality of cutting blades attached to each said rotor to project beyond the periphery thereof, said rotors being arranged so that in use they make a single cutting path, the axes of rotation of said rotors being inclined towards one another so that the cutting height of each rotor at approximately the middle of said cutting path is less than the cutting height at the outer edges of said cutting path and drive means connecting the rotors to the power take off of the tractor to drive the rotors in counterrotation towards one another at their leading edges with respect to the line of cut.

2. A rotary mower as claimed in claim 1 wherein the angle of inclination of said axes of rotation of the rotors relative to the vertical is between ¼° and 5°.

3. A rotary mower as claimed in claim 1 including a height adjustable inner support mounted on said primary frame skid located between the primary frame and said rotors and a height adjustable outer skid with an upturned forward end supported from the outer end of the rotor supporting beam.

4. An agricultural rotary mower comprising a primary frame, mounting means in said primary frame to engage the three point linkage assembly of a tractor, a rotor supporting beam supported from and extending to one side of said primary frame, two fixed spindles dependant from said rotor supporting beam, a ground engaging skid at the end of each said spindle, a single frustro conical blade transporting rotor rotatably mounted upon each said spindle, a plurality of cutting blades attached to each said rotor to project beyond the periphery thereof with the rotors in use forming a single cutting path, the spindles being inclined towards one another so that the cutting height of the rotors at the inner adjacent sides is 8 to 20 mm less that the diametrically opposite outer sides of the rotors, an inner adjustable skid between the primary frame and said rotors, an outer height adjustable skid and crop divider dependant from the outer end of the rotor support beam, a crop compression means supported from said rotor support beam in advance of the rotors to hold the crop in pressed down position prior to cutting so that in use a wide and relatively undisturbed swathe of crop is moved over the inclined surfaces of the frustro conical rotors, a pulley drivably connected to the top of each said rotor, two drive pulleys mounted in the primary frame, separate belt drives between the pulleys in the primary frame and the pulley on the top of each rotor to drive the rotors counterrotatively towards one another at their leading edges relative to the direction of movement of the mower in use, and a drive shaft rotatably mounted on said primary frame having one end operatively connected to said drive pulleys on the primary frame and the other end engagable with the power take-off of the tractor.

5. An agricultural rotary mower as claimed in claim 1 or claim 4 wherein said spindles are fixedly attached to said rotor supporting means.

* * * * *